United States Patent
Ott et al.

(10) Patent No.: US 7,686,227 B2
(45) Date of Patent: *Mar. 30, 2010

(54) CORDLESS HAND SCANNER WITH IMPROVED USER FEEDBACK

(75) Inventors: Leonard L. Ott, Livermore, CA (US); John E. Brandon, San Rafael, CA (US); Charles Ader, Livermore, CA (US)

(73) Assignee: Socket Mobile, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/200,512

(22) Filed: Aug. 28, 2008

(65) Prior Publication Data

US 2009/0095816 A1     Apr. 16, 2009

Related U.S. Application Data

(63) Continuation of application No. 11/082,190, filed on Mar. 16, 2005, now Pat. No. 7,429,000.

(60) Provisional application No. 60/554,080, filed on Mar. 17, 2004.

(51) Int. Cl.
*G06K 7/10* (2006.01)
(52) U.S. Cl. .............. 235/472.02; 235/383; 235/472.01
(58) Field of Classification Search ............ 235/472.02, 235/383, 385, 462.01, 472.01
See application file for complete search history.

(56) References Cited

U.S. PATENT DOCUMENTS

| | | | |
|---|---|---|---|
| 5,371,348 A | 12/1994 | Kumar et al. | |
| 5,382,779 A | 1/1995 | Gupta | |
| 5,479,001 A | 12/1995 | Kumar | |
| 5,496,992 A | 3/1996 | Madan et al. | |
| 5,625,180 A | 4/1997 | Hanson et al. | |
| 5,825,009 A | 10/1998 | Schmid et al. | |
| 5,828,052 A | 10/1998 | Reynolds et al. | |
| 5,992,747 A | 11/1999 | Katoh et al. | |
| 6,318,636 B1 | 11/2001 | Reynolds et al. | |
| 6,783,071 B2 | 8/2004 | Levine et al. | |

(Continued)

OTHER PUBLICATIONS

Excel Spreadsheet of Feb. 23, 2009 identifying references used to reject claims in related applications; 1 page.

(Continued)

*Primary Examiner*—Seung H Lee
(74) *Attorney, Agent, or Firm*—PatentVentures:; Bennett Smith; Korbin Van Dyke

(57) ABSTRACT

Increased confidence in, and acceptance of, cordless hand-held scanners may be obtained through a cordless hand-held scanner with improved user feedback. In an illustrative embodiment, the state of one or more indicators is changed as a result of feedback from a coupled host processor. The indicators are set to a first (or pending) state when a scan is performed, and remain in the first state up until the time the host feedback is received. The indicators are set to a second (or successful) state if the feedback indicates the host successfully received the scan data. The indicators are set to a third (or failure) state if the feedback indicates the host failed to properly receive the scan data. Obtaining timely confirmation that the host processor has received the scan successfully leads to increased confidence in, and acceptance of, the cordless hand-held scanner.

20 Claims, 2 Drawing Sheets

U.S. PATENT DOCUMENTS

| | | |
|---|---|---|
| 6,899,273 B2 | 5/2005 | Hussey et al. |
| 7,044,374 B2 | 5/2006 | Allison et al. |
| 7,080,788 B2 | 7/2006 | Koenck et al. |
| 7,429,000 B1 | 9/2008 | Ott et al. |

2003/0001018 A1   1/2003   Hussey et al.

OTHER PUBLICATIONS

Table of Sep. 1, 2009 identifying references used to reject claims in related applications; 1 page.

CORDLESS HAND SCANNER WITH IMPROVED USER FEEDBACK

CROSS REFERENCE TO RELATED APPLICATIONS

This application is a continuation of U.S. Non-Provisional patent application Ser. No. 11/082,190, filed Mar. 16, 2005) entitled CORDLESS HAND SCANNER WITH IMPROVED USER FEEDBACK, and which claims the benefit of U.S. Provisional Patent Application Ser. No. 60/554,080, filed Mar. 17, 2004) entitled CORDLESS HAND SCANNER WITH IMPROVED USER FEEDBACK. The foregoing applications are herein incorporated by reference for all purposes.

FIELD OF THE INVENTION

The teachings herein are related to hand scanners, such as those used to scan printed codes and RFID tags, and in particular to user interfaces for same.

BRIEF DESCRIPTION OF THE DRAWINGS

Various embodiments of the invention are disclosed in the following detailed description and the accompanying drawings.

DETAILED DESCRIPTION

Figure 1:
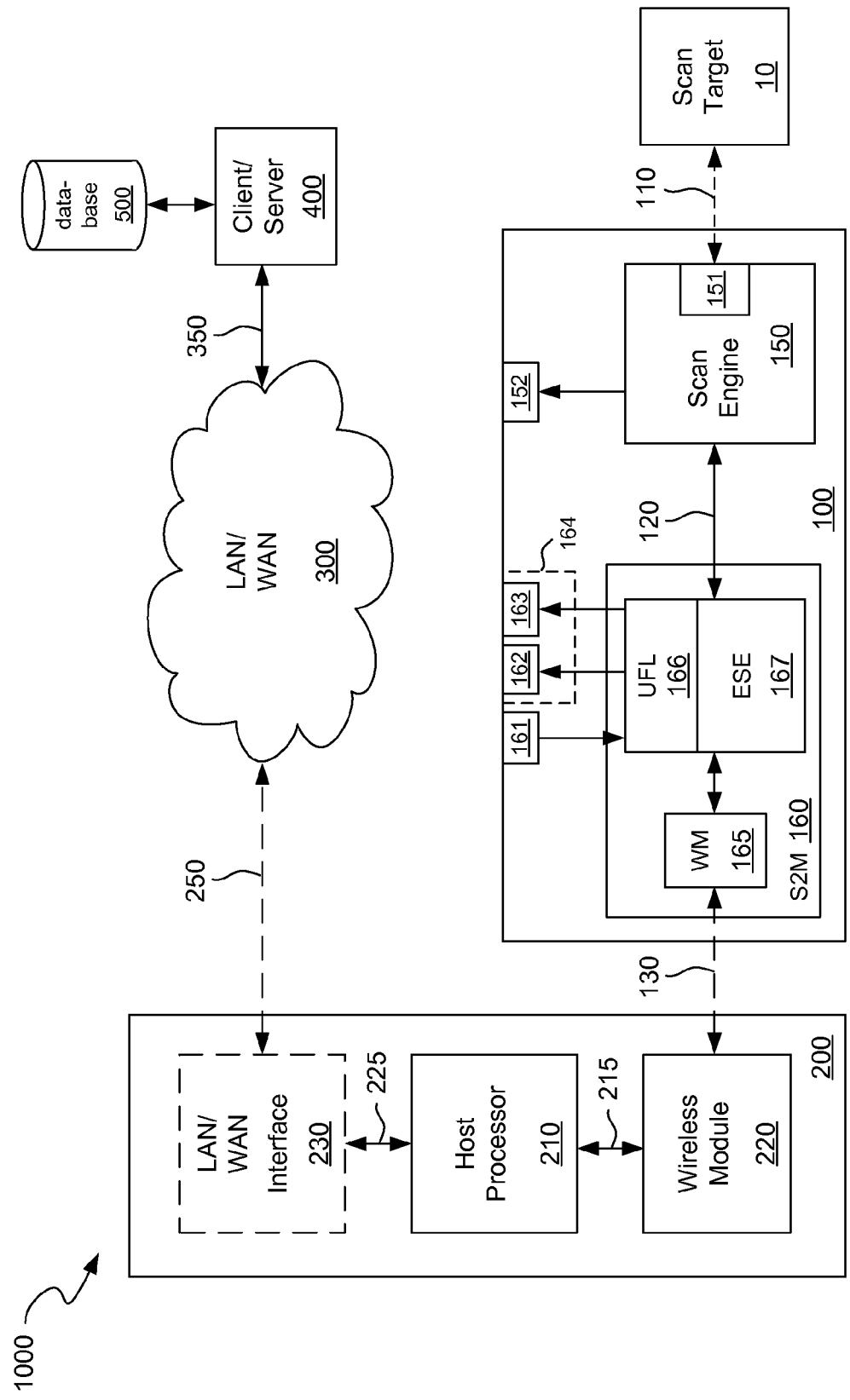
FIG. 1 shows a system context of an illustrative embodiment of a wireless scanner with improved user feedback.

The invention can be implemented in numerous ways, including as a process, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. Other embodiments, including those to which claims will ultimately be drawn, are discussed throughout the balance of the specification. Furthermore, the invention is not limited to just the embodiments disclosed in this disclosure, all of which are merely illustrative examples. As is discussed in more detail in the Conclusions, the invention encompasses all possible modifications and variations within the scope of the issued claims, which are appended to the very end of the issued patent.

Cordless (wireless) handheld scanners promise users greatly improved convenience, flexibility, and efficiency over previous corded scanners. The scan engines within such handheld scanners function quite reliably. In some environments, the wireless links are reliable and generally have robust error correction. Nevertheless, the overall path between the scan engine and a host processor (which receives the scan data) relies upon a number of more or less independent components and may use a variety of links, with varying degrees of reliability and error detection. Furthermore, the host processor may be busy or otherwise not available. Thus, a successful scan by the scan engine does not in itself assure a successful scan received by the host processor. If the user has grown accustomed to a corded scanner, user confidence (and thereby user acceptance) in using a cordless scanner may also be lacking simply due to unfamiliarity. Increased user confidence and acceptance for cordless handheld scanners and increased system performance and reliability may be obtained through improved user feedback in accordance with the teachings herein. In an illustrative embodiment, the state of one or more indicators on the cordless scanner is changed as a result of feedback from a coupled host processor. This is in contrast to previous scanners where scan confirmation indicators were based simply on whether the scan engine alone performed a successful scan. Obtaining timely confirmation that the host processor has received the scan successfully (or not) leads to increased confidence in, and acceptance of, the cordless handheld scanner and more adept use thereof.

Illustrative Combinations

This section includes a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive, and the invention is not limited to these highlighted combinations. As is discussed in more detail in the Conclusion section, the invention encompasses all possible modifications and variations within the scope of the issued claims, which are appended to the very end of the issued patent.

A first embodiment of a cordless scanner device for use in conjunction with at least one wireless enabled host processor, the first embodiment including: a scan engine, a wireless interface for coupling the scan engine to the wireless enabled host processor; at least one scan status indicator; user feedback logic coupled to the wireless interface and the at least one scan status indicator; a housing at least partially containing the scan engine, the wireless interface, the at least one scan state indicator, and the user feedback logic; and wherein the user feedback logic selectively changes the state of the at least one scan status indicator based upon scan confirmation status sent by the host processor. The preceding embodiment, wherein the scan confirmation status indicates whether or not the host processor successfully received scan data from the scan engine.

A second embodiment, including all of the aspects of the first embodiment, wherein the scan confirmation status is sent embedded in a command stream sent from the host processor to the scan engine. The second embodiment, wherein the scan confirmation status is sent as an extended simple serial interface (SSI) command. The second embodiment, wherein the user feedback logic captures the embedded scan confirmation status and implements the change in the at least one scan status indicator in accordance with the captured scan confirmation status. The preceding embodiment, wherein the at least one scan status indicator includes a green light. The preceding embodiment, wherein the green light does not illuminate until the host processor indicates that it has successfully received a scan. The preceding embodiment, wherein the green light is implemented using LED technology.

A third embodiment, including all of the aspects of either the first or the second embodiments, wherein the scan engine uses optics based scanning. The third embodiment, wherein the scan engine is for scanning bar codes. The third embodiment, wherein the scan engine includes a laser scanner. The third embodiment, wherein the scan engine includes a 1D CCD array. The third embodiment, wherein the scan engine includes a 2D CCD imager.

A fourth embodiment, including all of the aspects of either the first or the second embodiments, wherein the scan engine uses RF based scanning. The fourth embodiment, wherein the scan engine is for scanning RFID tags. The fourth embodiment, wherein the scan engine uses inductive coupling techniques. The fourth embodiment, wherein the scan engine uses perturbated reflected RF energy techniques. The fourth embodiment, wherein the scan engine uses microwave backscatter techniques.

A fifth embodiment, including all of the aspects of any of the first through the fourth embodiments, wherein the wireless interface of the wireless scanner is compatible with an industry standard for personal area wireless networking. The forgoing embodiment wherein the industry standard is compatible with the Bluetooth standard. A sixth embodiment, including all of the aspects of any of the first through the fourth embodiments, wherein the wireless interface of the wireless scanner is compatible with an industry standard for local area wireless networking. The forgoing embodiment wherein the industry standard is compatible with the WiFi standard. A seventh embodiment, including all of the aspects of any of the first through the fourth embodiments, wherein the wireless interface of the wireless scanner is infrared.

An eighth embodiment, including all of the aspects of the first embodiment, wherein the scan status indicators transition between states that include: standby for host confirmation and good scan at host. The preceding embodiment, wherein the states further include: waiting on user, and bad scan at host.

A ninth embodiment, including all of the aspects of the first embodiment, wherein the scan engine performs a scan only when the wireless link between the scan engine and the host processor is working.

Wireless Scanner System

FIG. 1 shows an illustrative embodiment of a wireless scanner 100 with improved user feedback in the context of system 1000. In system 1000, scan target 10 is scanned by scanner 100 via scan process 110. Scan process 110 may take a variety of forms, including (but not limited to) passive and active optical and RF techniques for scanning printed codes and RFID tags.

Scanner 100 includes scan engine 150 (including scan transducer 151 and audible indicator 152) coupled via 120 to Scanner-to-Host (S2H) interface module 160, control 161, visual indicator group 164 (including visual indicator 162 and visual indicator 163). Scanner-to-Host (S2H) interface module 160 includes wireless module (WM) 165, User Feedback Logic (UFL) 166 and Extended SSI Engine (ESE) 167. In an illustrative embodiment, coupling 120 is logically compatible with an RS-232 link.

Scanner 100 communicates scan data to host 200 via wireless connection 130. Wireless connection 130 may take a variety of forms, including (but not limited to) Personal Area Network (PAN) technology (e.g., Bluetooth or ZigBee), Local Area Network technology (e.g., WiFi), or optical technology (e.g., infrared). In illustrative embodiments, for applications where host 200 is a PDA, Tablet PC, or phone, Bluetooth class 2 is used, having a range of roughly 10 meters. For applications where host 200 is a desktop, Bluetooth class 1 is used, having a range of roughly 100 meters.

Host 200 may take a variety of forms, including (but not limited to) point-of-sale terminals; desktop, laptop, and tablet PCs; PDAs; and mobile phones. Host 200 includes host processor 210 coupled via link 215 to wireless module 220 and optionally via interconnect 225 to optional LAN/WAN interface 230. In an illustrative embodiment, link 215 is connected to a standard com (serial communications) port of the host processor. Host 200 includes an operating system (such as Symbian, Palm, Microsoft, Linux, or embedded variations of the foregoing, depending on the platform) and device drivers for scanner 100.

In illustrative embodiments where the host is a PDA or phone, link 215 uses a protocol compatible with the industry standard H4 serial protocol to communicate the SSI data between the host processor and the scanner. In illustrative embodiments where the host is a desktop, laptop, or tablet PC, a protocol compatible with the industry standard USB protocol is used.

Host 200 optionally communicates over network LAN/WAN 300 to client/server 400 (via host-to-network link 250 and client/server-to-network link 350). LAN/WAN 300 may take a variety of forms including (but not limited to) a LAN, a larger departmental network, an intranet, and the Internet. Links 250 and 350 may take a variety of forms including (but not limited to) Ethernet, WiFi, RS-232, dial-up modem, and mobile phone technologies. Wireless links employ antennas, perhaps embedded within their associated devices, perhaps at least partially external, none of which are explicitly shown, but are understood to be present to those of ordinary skill in the art.

Client/server 400 generally has an associated database 500 that may be queried or updated in response to the scan of scan target 10. Alternatively, such a database may in whole or in part reside on host 200 and be queried or updated locally, and the LAN/WAN connection may be established periodically to synchronize the local and remote copies of the database.

The scan data is transferred over the links using various degrees of encoding and encapsulation. Scan engine 150 communicates using the industry standard Simple Serial Interface (SSI) protocol, which encapsulates ASCII data corresponding to scanned code. Example off-the-shelf SSI modules suitable for use as scan engine 150 include (but are not limited to) the 923, 824, and Positron modules, all by Symbol Technologies. ESE 167 and host processor 210 communicate using an extension of the SSI protocol, described below. The extended SSI protocol is bridged onto the wireless link 130. The device drivers within host 200 (for use with scanner 100), and the firmware within ESE 167, are designed specifically to use the extended SSI protocol.

In an illustrative embodiment, data received by ESE 167 from the host processor 210 over the wireless link 130, is generally resent over the RS-232 link 120 as a command to the scan engine 150 using an RTS/CTS control handshake. Data received by ESE 167 from the scan engine 150 over the RS-232 link 120, is generally resent to the host processor 210 using the flow control protocol of the wireless link 130.

To permit the host processor 210 to send messages to scanner 100 over the wireless link 130, a current SSI command from the "HOST" to the scan engine has been lengthened. In an illustrative embodiment, the command selected is the SSI command CMD_NAK, which has the Opcode 0xD1 and a minimum length of 6 bytes.

As illustrated in the following table, an SSI Sub Command of CMD_NAK is defined with a payload that includes an indication that the host processor did (ACK), or did not (FAIL), receive a good scan. How these indications are used is detailed in conjunction with examination of FIG. 2, discussed next. Those skilled in the art will appreciate that other methods of extending the SSI command set, or the use of a custom command set, could equivalently be used to provide the scanner with the host scan confirmation status without deviating from the concepts taught herein.

TABLE 1

Host Scan Confirmation Status (Extended SSI Command)

| Field Name | Format | Size | Description |
| --- | --- | --- | --- |
| Length | 0x07 | 1 Byte | Length of packet (excludes CS) |
| Opcode | 0xD1 | 1 Byte | SSI Opcode (always 0xD1) |
| Message Source | 0x04 (Host) | 1 Byte | Identifies where the message is coming from. |
| Status | Bit 0: Retransmit | 1 Byte | Identifies the transmission status. |
|  | Bit 1-7: unused |  | Unused bits must be set to 0. |
| Sub Command | 0x0008 | 2 Bytes | Host Scan Confirmation Status |
| Payload |  | 1 Byte | Scan Confirmation Status: 0x00 = bad scan (FAIL) 0x01 = scan received OK (ACK) |
| Checksum |  | 2 Bytes | Checksum of message. |

Wireless Scanner User Feedback

Figure 2:
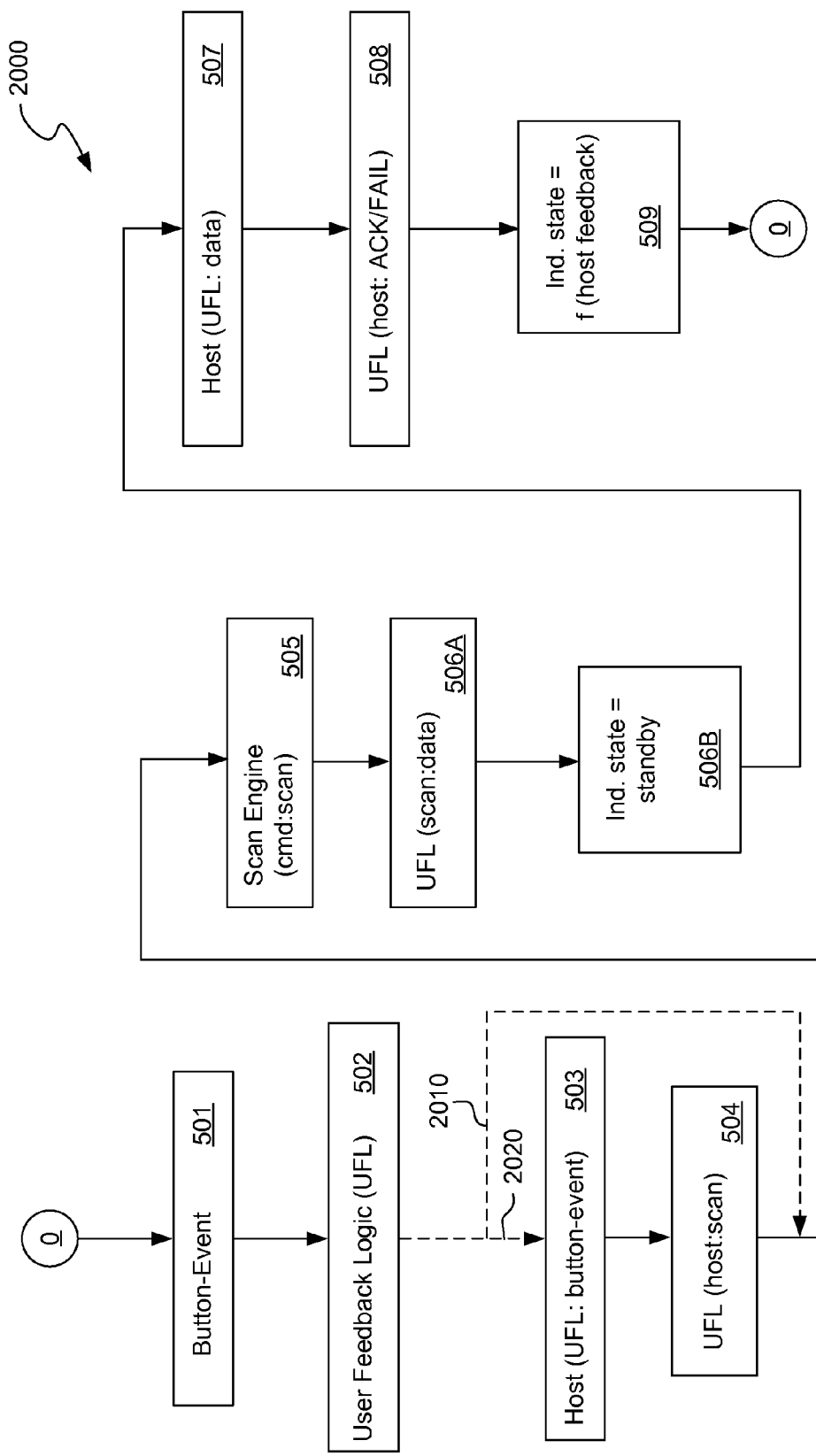
FIG. 2 is a flow diagram illustrating improved user feedback in a wireless scanner.

FIG. 2 is a flow diagram conceptually illustrating improved user feedback in a wireless scanner. There are actually multiple embodiments illustrated by this figure, corresponding to dashed paths 2010 and 2020. These options and embodiments will be discussed in due course, below.

Flow begins conceptually at step 0, corresponding to waiting for a new scan to be user initiated. Button-event, step 501, corresponds to the user initiating a scan by pressing the scan button 161. The button-event is then noted by User-Feedback Logic (UFL) 166 in step 502.

From step 502 flow continues down one of path 2010 or 2020. In a first embodiment, corresponding to path 2020, the host processor 210 receives notice of the button-event from the UFL 166 in step 503. The UFL 166 subsequently receives a scan initiation command from the host processor 210 in step 504. In a second embodiment, flow follows path 2010, bypassing steps 503 and 504 (these steps are not implemented if path 2010 is followed). In both embodiments, flow continues to step 505.

The scan engine 150 receives the scan initiation command from the UFL 166 in step 505, and initiates a scan. The scan engine returns scan data and status to the UFL 166 in step 506A.

Whether to use path 2010 or 2020 is an implementation dependent choice. Generally, path 2020 is preferable if the additional steps do not introduce a significant delay in initiating the scan. When flow includes path 2020, the UFL 166 will not proceed to step 505 until it receives a scan command from the host processor 210. If the scan command is not received within a timeout interval, the flow returns to step 0, without the scan engine being activated. This abnormal timeout path is not explicitly illustrated in FIG. 2. Not activating the scan engine when the wireless link is down is considered a significant benefit of using the embodiment of path 2020. Activating the scan engine (which generates scanning behavior that the user generally perceives) when the wireless link is down may confuse the user.

Reduced path delay frequently is in tension with reduced power consumption. E.g., if a Bluetooth wireless link is used for link 130, the sleep configuration of the Bluetooth radios adjusts how often the radios are enabled within their allocated time slots, which directly impacts both battery life and latency. If the overall path latency prior to initiating the scan is too much, and reducing the latency by increasing power consumption is not an option, then path 2010 should be used.

The state of the visual indicators 164 is changed to "standby" (amber light 162 is lit) in step 506B, which corresponds to the first opportunity that the UFL 166 has to receive scan data from the scanner. The standby indication gives visual feedback that the scan action has been completed locally and that the scanner is waiting for host confirmation (i.e. host confirmation is pending). Those skilled in the art will recognize that the location of the step setting the pending indication is not critical, although the exact definition of the standby indication necessarily may change as a result of its placement in the control flow.

In step 507, the UFL 166 forwards the scan data and status to the host processor 210. Once the host processor 210 has determined that the scan was successful, it communicates this success state back to the UFL 166 (via the ACK), in step 508. If the host processor 210 determines that the scan was not successful (based on the scan status, invalid data, or an elapsed time-out interval), then the host processor 210 optionally communicates this failure state back to the UFL 166 (via the FAIL).

In step 509, the state of the visual indicators 164 is updated as function of the host feedback. In the event of success, the UFL 166 changes the pending indication to a successful completion indication (amber light 162 is extinguished and green light 163 is lit). In the event of failure (either due to an explicit FAIL from the host, or due to a timeout without ACK), the UFL 166 changes the pending indication to a failure indication (e.g., by extinguishing amber light 162 and keeping green light 163 dark, flashing the amber light 162, or by an additional red light indicator, not explicitly shown). Optionally in step 509, UFL 166 also sends a command to Scan Engine 150 to sound audible indicator 152 to provide positive or negative audible feedback (e.g., a short pleasant tone for a successful scan, a long discordant buzz for a failed scan). After step 509, the process conceptually returns to step 0, corresponding to waiting for a new scan to be user initiated.

In the foregoing illustrative embodiments, there are thus four states (or modes) among which the indicators transition.

These states (and associated example visual and audible indications) are Waiting on User (no lights), Standby for Host Confirmation (amber light), Good Scan at Host (green light, positive tone), and Bad Scan at Host (red light, negative tone).

Conclusion

Although the foregoing embodiments have been described in some detail for purposes of clarity of understanding, the invention is not limited to the details provided. There are many alternative ways of implementing the invention. The disclosed embodiments are illustrative and not restrictive. It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. Also, unless specifically stated to the contrary, the value ranges specified, the maximum and minimum values used, or other particular specifications (such as the quantity, type, and speed of processors and memory; interface bandwidths; the degree of redundancy for any particular component or module; the particular version of an interface standard or component; and the number of entries or stages in registers and buffers), are merely those of the illustrative embodiments, can be expected to track improvements and changes in implementation technology, and should not be construed as limitations.

Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other portable peripheral applications, and are not limited to the particular application or industry of the illustrated embodiments. The invention is thus to be construed as including all possible modifications and variations encompassed within the scope of the claims appended to the issued patent.

What is claimed is:

1. A method of scanning an object, the method comprising:
   in a handheld scanner, receiving commands from a host via a wireless link;
   controlling a scan engine at least in pan via at least one control command of the commands;
   embedding scan success state into a status command of the commands;
   in the handheld scanner, responding to the commands received from the host, including setting a scan status indicator to a final state in response to the status command; and
   containing at least partially the scan status indicator within a scanner housing adapted to handheld scanning.

2. The method of claim 1, wherein the object is at least one of a printed code and an RFID tag.

3. The method of claim 2, wherein the printed code is a barcode.

4. The method of claim 1, wherein the scan status indicator is a visual indicator.

5. The method of claim 1, wherein the scan status indicator is an audible indicator.

6. The method of claim 1, wherein if the scan success state is a fail state, then the final state of the scan status indicator is a failure state.

7. The method of claim 1, wherein if the scan success state is an ack state, then the final state of the scan status indicator is a success state.

8. The method of claim 1, further comprising containing the scan engine within the scanner housing.

9. The method of claim 1, further comprising forwarding scan data produced by the scan engine to the host.

10. The method of claim 9, further comprising setting the state of the scan status indicator to a standby state before the forwarding.

11. The method of claim 9, further comprising initiating a scan to produce the scan data, the scan initiation being in response to the at least one control command.

12. The method of claim 9, further comprising initiating a scan to produce the scan status associated with the scan data, the scan initiation being in response to the at least one control command.

13. A system for scanning an object, the system comprising:
    in a handheld scanner, means for receiving commands from a host via a wireless link;
    means for controlling a scan engine at least in part via a control command of the commands;
    means for embedding scan success state into a status command of the commands;
    in the handheld scanner, means for responding to the commands received from the host, including means for setting a scan status indicator to a final state in response to the status command; and
    means for containing at least partially the scan status indicator within a scanner housing adapted to handheld scanning.

14. The system of claim 13, wherein the object is at least one of a printed code and an RFID tag.

15. The system of claim 14, wherein the printed code is a barcode.

16. The system of claim 13, wherein the scan status indicator is a visual indicator.

17. The system of claim 13, wherein the scan status indicator is an audible indicator.

18. A system comprising:
means for receiving notice of a scan initiation event from a handheld scanner via a wireless link;
means for communicating a scan initiation command from a host to the scanner via the wireless link;
means for receiving scan results from the scanner via the wireless link, the scan results being obtained in response to the scan initiation command;
means for determining scan status in response to the scan results;
means for communicating the scan status to the scanner via the wireless link; and
wherein the scanner is a handheld scanner having a housing at least partially containing a scan engine to provide the scan results and an indicator that is altered in response to the scan status.

19. The system of claim 18, wherein the host is at least one of a mobile phone, a PDA, a laptop PC, a tablet PC, a desktop PC, and a Point-Of-Sale terminal.

20. The system of claim 18, wherein the wireless link is compatible with at least one of Bluetooth wireless technology, ZigBee Wireless technology, WiFi wireless technology, and infrared wireless technology.

* * * * *